(12) United States Patent  
Chen

(10) Patent No.: US 9,393,653 B2  
(45) Date of Patent: Jul. 19, 2016

(54) PROCESSING SYSTEM AND METHOD FOR A WORK PIECE SURFACE

(71) Applicant: Qiyue Chen, Taizhou (CN)

(72) Inventor: Qiyue Chen, Taizhou (CN)

(73) Assignee: TaiZhou Federal Robot Technology Co., Ltd, Taizhou (CN)

(*) Notice: Subject to any disclaimer, the term of this patent is extended or adjusted under 35 U.S.C. 154(b) by 30 days.

(21) Appl. No.: 14/580,193

(22) Filed: Dec. 22, 2014

(65) Prior Publication Data

US 2015/0367464 A1    Dec. 24, 2015

(30) Foreign Application Priority Data

Jun. 23, 2014  (CN) .......................... 2014 1 0283672

(51) Int. Cl.

| | |
|---|---|
| *B24B 27/00* | (2006.01) |
| *B23P 23/02* | (2006.01) |
| *B24B 29/02* | (2006.01) |
| *B24B 41/06* | (2012.01) |
| *B23C 1/00* | (2006.01) |
| *B23Q 7/04* | (2006.01) |

(Continued)

(52) U.S. Cl.

CPC . *B23P 23/02* (2013.01); *B23C 1/00* (2013.01); *B23Q 7/04* (2013.01); *B23Q 7/047* (2013.01); *B23Q 7/1415* (2013.01); *B23Q 39/027* (2013.01); *B24B 29/02* (2013.01); *B24B 41/06* (2013.01); *B25J 11/0065* (2013.01); *B25J 15/0052* (2013.01); *G01M 3/02* (2013.01); *B23C 2220/60* (2013.01)

(58) Field of Classification Search

CPC ....... B23P 23/02; B23C 1/00; B23C 2220/60; B23Q 7/04; B23Q 7/047; B23Q 7/01415; B23Q 39/027; B24B 29/02; B24B 41/06; B25J 11/0065; B25J 15/0052; G01M 3/02

USPC ................................................ 451/54, 66–67

See application file for complete search history.

(56) References Cited

U.S. PATENT DOCUMENTS

| | | | | |
|---|---|---|---|---|
| 3,964,209 A | * | 6/1976 | Konnikov | ................. B24B 3/34 29/33 R |
| 4,653,231 A | * | 3/1987 | Cronkhite | ............. B24B 37/345 451/388 |

(Continued)

FOREIGN PATENT DOCUMENTS

| | | |
|---|---|---|
| CN | 201010613558.9 | 7/2011 |
| CN | 201210592931.6 | 5/2013 |

(Continued)

*Primary Examiner* — George Nguyen

(74) *Attorney, Agent, or Firm* — Minder Law Group; Willy H. Wong

(57) ABSTRACT

A processing system and method for a work piece surface in the mechanical technical field. The processing system is disposed on the side of the processing center which could machine the work piece which comprises two milling cutter carving machines symmetrically located on both sides of the processing center and an article positioning shelf located between the said two milling cutter carving machines to place the work piece. A first manipulator is provided between the processing center and the article positioning shelf and between the two milling cutter carving machines. The first manipulator transfer the work piece among the processing center, the article positioning shelf and two milling cutter carving machines. A group of polishing units is located on the side of the article positioning shelf. A second manipulator is provided in the polishing unit which transfers the work piece.

11 Claims, 5 Drawing Sheets

(51) Int. Cl.
*B23Q 7/14* (2006.01)
*G01M 3/02* (2006.01)
*B25J 11/00* (2006.01)
*B23Q 39/02* (2006.01)
*B25J 15/00* (2006.01)

(56) References Cited

U.S. PATENT DOCUMENTS

| | | | | |
|---|---|---|---|---|
| 4,715,147 A | * | 12/1987 | Millay | B23Q 11/00 451/28 |
| 5,361,545 A | * | 11/1994 | Nakamura | B24B 37/345 451/287 |
| 5,908,347 A | * | 6/1999 | Nakajima | B24B 37/345 451/285 |
| 6,357,994 B1 | * | 3/2002 | St. Onge | B23F 23/04 198/468.2 |
| 6,966,818 B1 | * | 11/2005 | Carlson, III | A61F 2/30 451/365 |
| 6,991,524 B1 | * | 1/2006 | Cooper | B29B 17/02 451/272 |
| 7,037,174 B2 | * | 5/2006 | Chen | B24B 37/042 257/E21.304 |
| 7,241,200 B2 | * | 7/2007 | Kalanovic | B24B 51/00 125/30.01 |
| 7,273,408 B2 | * | 9/2007 | Chen | B24B 41/005 451/11 |
| 7,299,533 B1 | * | 11/2007 | Bickersteth | B23F 17/008 29/429 |
| 7,347,765 B2 | * | 3/2008 | Koch | B23Q 7/1405 451/10 |
| 2007/0147961 A1 | * | 6/2007 | Salamanca | B24B 27/04 405/232 |
| 2010/0099340 A1 | * | 4/2010 | Chen | B24B 37/16 451/287 |
| 2010/0261411 A1 | * | 10/2010 | Reinmoeller | B24B 17/00 451/5 |
| 2014/0242885 A1 | * | 8/2014 | Nakao | B24B 37/345 451/57 |

FOREIGN PATENT DOCUMENTS

| | | |
|---|---|---|
| CN | 201310346669.1 | 12/2013 |
| CN | 201320401894.6 | 12/2013 |
| CN | 201320457554.5 | 1/2014 |
| CN | 201310653014.9 | 3/2014 |

* cited by examiner

PROCESSING SYSTEM AND METHOD FOR A WORK PIECE SURFACE

RELATED APPLICATIONS

This application claims benefit of Chinese Patent Application No. CN201410283672.8, filed Jun. 23, 2014. The above application is incorporated by reference herein.

BACKGROUND OF THE INVENTION

1. Field of Invention

The present invention relates to a processing system for a work piece in the mechanical technical field, and in particular, to a processing system and method for a work piece surface.

2. Related Art

In the Manufacturing Industry, in Order to Guarantee the Quality and Aesthetic appearance of the products, polishing and finishing of the work piece are important processes for molding of work pieces. In the conventional manufacturing means, polishing is generally carried out on the work piece surface by using a polisher. However, the conventional work piece processing means substantially could not form a set of complete system. As such, operators firstly place the semi-finished work piece on the processing equipment for machining to form a required shape, and then take the work piece out of the processing equipment and mount the work piece onto the polishing equipment for polishing. Even though the work piece could be polished in such a manner, much energy and time of operators will be consumed, which leads to a not high degree of automation and low production efficiency of enterprises. Additionally, as the work piece is manually mounted by the operators, the mounting degree and position of each work piece could not be maintained identical to each other. Consequently, the polishing precision of each work piece subject to polishing is not the same as each other.

In order to address the aforesaid problems, the applicant of this invention proposed a processing system for a work piece surface, which has an application number of 201310653014.9 and a publication number of CN103659535A. The processing system comprises at least one group of polishing units and at least one finishing device to finish the polished work piece. A manipulator and several polishers are provided on the polishing unit. The manipulator could continuously hold the machined work pieces at the processing center and transfer them to the polisher corresponding to the polishing unit where the manipulator is located in a determined sequence for polishing. The finishing device is located on the side of the polishing unit. The processing system for work piece surface uses the manipulator to hold the work pieces already machined at the processing center to the polishing unit where the manipulator is located for polishing. As several polishers with different polishing precisions are positioned in one polishing unit, the work piece surface, subject to polishing by all the polishers in one polishing unit, will have a quite high polishing precision. Moreover, each work piece is held by the manipulator controlled by program, so that the actions of the manipulator to hold the work piece are the same, which guarantees a uniform polishing precision of each work piece. Additionally, as the processing speed of the work piece at the processing center is far higher than the polishing speed of the polishing unit, a number of groups of polishing units could be provided to improve the operation efficiency.

Although the aforesaid processing system for work piece surface has several advantages, there are still some disadvantages. For example, the work piece surfaces are generally rough before being polished. In particular, rust might exist on the work piece surface while the article to be polished is a metallic product. To this end, even though a relatively high polishing precision will be provided to the work piece surface after the same has been polished by all the polishers in a polishing unit, the polishing duration is relatively long, leading to long processing period and not high efficiency of the whole processing system.

SUMMARY OF THE INVENTION

It is an object of the invention to address the problems existing in the prior art. The present invention provides a processing system and processing method for a work piece surface which could shorten polishing period and improve polishing efficiency.

The object of the invention could be achieved by the following technical solution. A processing system for a work piece surface disposed on the side of the processing center which could machine the work piece. The processing system comprises two milling cutter carving machines symmetrically located on both sides of the processing center and an article positioning shelf located between the said two milling cutter carving machines to place the work piece. A first manipulator is provided between the processing center and the article positioning shelf and between the two milling cutter carving machines. The first manipulator could transfer the work piece among the processing center, the article positioning shelf and two milling cutter carving machines. A group of polishing units is located on the side of the article positioning shelf. A second manipulator is provided in the polishing unit which could transfer the work piece between the article positioning shelf and the polishing unit.

The semi-finished work piece is machined in the processing center before surface processing. Subsequent to machining, the first manipulator holds the machined work piece and transfers the same to the milling cutter carving machine for surface peeling. After the work piece surface is subject to peeling by the milling cutter carving machine, the first manipulator holds the work piece subject to peeling and transfers the work piece to the article positioning shelf for placing. Thereafter, the second manipulator located in the polishing unit holds the work piece on the article positioning shelf and transfers the same into the polishing unit for surface polishing.

As the work piece is firstly subject to surface peeling in the milling cutter carving machine after being machine, the work piece surface subject to peeling could be smoothly polished in the polishing unit, which could largely shorten polishing period and improve polishing efficiency. Additionally, the machining speed of the work piece in the processing center is larger than the peeling speed of the milling cutter carving machine, two milling cutter carving machines are provided to enhance the processing efficiency, which ensures the machined work piece could be subject to peeling in time. As the actions of the first and second manipulators are controlled by program, the two milling cutter carving machines are symmetrically disposed to simply setting of the program. To this end, the first manipulator acts in the same manner between the two milling cutter carving machines, which also significantly enhances processing efficiency.

In the processing system for work piece surface, a seal detection device is further located between the two milling cutter carving machines and the two milling cutter carving machines are symmetrically disposed on both sides of the seal detection device. The seal detection device is located between the first manipulator and the article positioning shelf. The first manipulator could hold the work piece to perform detection of sealing performance on the seal detection device.

Detection of sealing performance could be conducted against the work piece by using a pressure test platform. After the work piece is machined by the processing center, the first manipulator holds the machined work piece to the seal detection device for detection of sealing performance. Disqualified work pieces could be screened by the detection of sealing performance before the work piece surface is processed.

In the processing system for work piece surface, the two milling cutter carving machines are symmetrically disposed on left and right sides of the first manipulator.

Two milling cutter carving machines are symmetrically disposed on left and right sides of the first manipulator. That is to say, the distances from the first manipulator to two milling cutter carving machines are the same, which ensures the moving distance of the work piece by the first manipulator between the article positioning shelf and one milling cutter carving machine is identical to that between the article positioning shelf and the other milling cutter carving machine. Therefore, the actions of the first manipulator between the article positioning shelf and two milling cutter carving machines are the same as each other.

In the processing system for work piece surface, a semi-finished article shelf is further located between the two milling cutter carving machines to place the semi-finished work piece. The semi-finished article shelf is juxtaposed with the article positioning shelf. The first manipulator could transfer the semi-finished work piece between the semi-finished article shelf and the processing center.

Before machining, the first manipulator firstly holds the semi-finished work piece at the semi-finished article shelf and then transfers the semi-finished work piece to the processing center for machining. Automatic feeding is achieved on the processing center by using the first manipulator, so that automatic control is conducted on machining of the work piece and processing of the work piece surface, which further improves processing efficiency of the work piece.

In the processing system for work piece surface, the semi-finished article shelf and article positioning shelf are both evenly provided with several locating pins on the surface thereof for positioning the work piece. The semi-finished work piece is fixed on the semi-finished article shelf via a locating pin. When the first manipulator holds the work piece subject to peeling and transfers the same to the article positioning shelf for placing, the locating pin of the article positioning shelf is matched with the inner bore of the work piece in such a way that the work piece could be precisely and securely located on the article positioning shelf.

In the processing system for work piece surface, the number of the locating pins corresponding to each work piece is 1-3. When the work piece to be processed by the processing system for work piece surface of the invention is a water faucet, 1~3 locating pins could be exactly corresponding to two water inlet holes and one water outlet hole on the valve core in the water faucet.

In the processing system for work piece surface, a connecting base is fixed on the first manipulator. A connecting shaft base is connected with the front end of the connecting base. The end of the connecting shaft base is connected with a three-claw pneumatic chuck. A claw is fixed on each of three heads of the three-claw pneumatic chuck by a fastener respectively.

When the first manipulator is used to hold the work piece, air is supplied to the three-claw pneumatic chuck on the first manipulator, to make the three heads on the three-claw pneumatic chuck contract inward simultaneously and three claws fixedly connected with three heads contract inward simultaneously and press tightly against the outer surface of the work piece. Consequently, the work piece is securely held.

In the processing system for work piece surface, the connecting shaft base is of a T-shape. A motor is provided within the connecting base. The output shaft of the motor is connected with the connecting shaft base and the connecting shaft base could turn relative to the connecting base driven by rotation of the output shaft of the motor. The three-claw pneumatic chuck is connected with each of left and right ends of the connecting shaft base respectively. The claws are fixed on three heads of the three-claw pneumatic chuck at the left end of the connecting shaft base by fasteners respectively. A locating post is fixed on each of three heads of the three-claw pneumatic chuck at the right end of the connecting shaft base by a fastener respectively.

When the work piece is a water faucet, the first manipulator holds the semi-finished work piece by using the claw on the three-claw pneumatic chuck at the left end of the connecting shaft base and transfers the same to the processing center. Thereafter the first manipulator holds the machined water faucet by inserting three locating posts on the three-claw pneumatic chuck at the right end of the connecting shaft base into two water inlet holes and one water outlet hole on the valve core in the machined water faucet. Then the motor in the connecting base rotates to turn the connecting shaft base by 180 degrees. The first manipulator mounts the semi-finished work piece on the three-claw pneumatic chuck at the left end of the connecting shaft base into the processing center for machining. Two three-claw pneumatic chucks are provided as such, to not only improve the efficiency of the first manipulator, but also reduce the moving times of the first manipulator between the article positioning shelf and the processing center and thus shorten the time for transferring the work piece.

The processing method for a work piece surface, comprising the following steps:
 (A) gripping a work piece, in which a first manipulator holds a machined work piece at the processing center and transfers the held work piece to a milling cutter carving machine for mounting;
 (B) surface peeling, in which several work positions are provided on the milling cutter carving machine, and after the first manipulator holds the work pieces in the same number as that of the work positions on the milling cutter carving machine in turn and transfers them to the milling cutter carving machine for mounting, the milling cutters on the milling cutter carving machine corresponding to each of the work positions perform peeling against the surface of the work pieces mounted in the milling cutter carving machine simultaneously; and
 (C) polishing, in which the first manipulator holds the work pieces subject to peeling on the milling cutter carving machine in turn and transfers the same to the article positioning shelf for placing, and a second manipulator in a polishing unit holds the work piece subject to peeling on the article positioning shelf and transfers the same to the polishing unit for polishing.

Before the work piece surface is processed, the semi-finished work piece is machined at the processing center. After the work piece is machined, the first manipulator holds the machined work piece and transfers the same to the milling cutter carving machine for mounting. Several work positions are provided on the milling cutter carving machine. In order to maximize use rate of the milling cutter carving machine, the milling cutter carving machine is controlled to operate after the machine work pieces occupy all the work positions on the milling cutter carving machine, and the milling cutters corresponding to the clamping heads on the milling cutter carving machine perform peeling against the machined work piece surface. After the work piece surface is subject to peeling, the first manipulator holds the work pieces subject to peeling on the milling cutter carving machine in turn and transfers each of the work pieces subject to peeling to the article positioning shelf for placing. The second manipulator in the polishing unit will hold the work pieces subject to peeling in the article positioning shelf and transfer them to the polishing unit for polishing.

In the processing method for work piece surface, in the step (A), the first manipulator firstly holds the semi-finished work piece at the semi-finished article shelf and transfers the same to the processing center for machining.

In the processing method for work piece surface, in the step (A), after the first manipulator holds the machined work piece at the processing center, the first manipulator firstly transfers the work piece to the seal detection device for detection of sealing performance, and subsequent to detection the first manipulator holds the work piece passing the detection and transfers the same to the milling cutter carving machine.

In the processing method for work piece surface, in the step (B), two milling cutter carving machines are provided, in which while the milling cutters on one of the said milling cutter caving machines perform peeling against the work piece surface, the first manipulator holds the machined work pieces at the processing center and transfers them to the other milling cutter carving machine for mounting.

In order to guarantee the orderly action of the first manipulator and ensure the machined work pieces at the processing center to be subject to surface peeling in time, while one of the milling cutter carving machines performs peeling against the work pieces, the first manipulator holds the machined work pieces for mounting on the other milling cutter carving machine. And while the previous milling cutter carving machine finishes peeling against the work piece surface and the first manipulator has to transfer the work pieces to the article positioning shelf for placing, the other milling cutter carving machine is in operation.

In the processing method for work piece surface, in the step (B), the number of the clamping heads on the milling cutter carving machine is 8, the peeling period of each of the milling cutter carving machines lasts for three minutes and the polishing period of the polishing unit in the step (C) lasts for two minutes.

Two milling cutter carving machines are provided. Eight clamping heads are located on each milling cutter carving machine. The peeling period of each milling cutter carving machine lasts for three minutes. As such, each work piece is subject to peeling on the milling cutter carving machine for two minutes and the polishing period of the polishing unit lasts for two minutes. Therefore, after the second manipulator holds a work piece subject to peeling and the polishing is finished, the second manipulator could immediately hold another work piece subject to peeling on the article positioning shelf to the polishing unit for polishing, which guarantees continuity of operation.

In the processing method for work piece surface, in the step (A), the work piece held by the first manipulator is subject to air blowing to blow off the copper powder on the machined work piece before the first manipulator transfers the machined work piece to the work station of the seal detection device. In the process of air blowing, the first manipulator does not stop moving. The copper powder on the outer surface of the work piece is blown off before detection of sealing performance is conducted, which not only increase the accuracy of detection of sealing performance but also reduces its impact on the subsequent surface peeling step, thereby improving processing efficiency. A conventional air blower could be provided along the moving path of the first manipulator, to release the first manipulator from cease of movement, which further improves the efficiency.

Compared with the prior art, the processing system and method for a work piece surface of the invention have the following advantages.

Firstly, according to the processing system and method for a work piece surface of the invention, after the work piece is machined, the first manipulator transfers the work piece to the milling cutter carving machine for surface peeling. The polishing efficiency of the polishing unit is improved and the polishing period is largely shortened by surface peeling.

Secondly, according to the processing system and method for a work piece surface of the invention, a seal detection device is provided so that detection of sealing performance could be performed after the work piece is machined. Therefore, disqualified work pieces could be found out in time and the time required for detection after the work piece surface is processed could be saved.

Thirdly, according to the processing system and method for a work piece surface of the invention, two three-claw pneumatic chucks are provided on the first manipulator to hold the work pieces. After one three-claw pneumatic chuck holds the machined work piece, the other three-claw pneumatic chuck is used to transfer the semi-finished work piece to the processing center, which could significantly save the operation time of the first manipulator for moving back and forth, and further save the operation time of the whole processing system.

Fourthly, according to the processing system and method for a work piece surface of the invention, two milling cutter carving machines and a group of polishing units are provided to the processing center. Each milling cutter carving machine could be equipped with eight clamping heads, which could maximize the efficiency in cooperative operation of the milling cutter carving machines and polishing units and guarantee continuity in processing of the work pieces.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The embodiments of the invention will be described below and the technical solutions of the invention will be further illustrated in connection with the accompanying figures. However, the present invention shall not be limited to these embodiments.

First Embodiment

Figure 1:
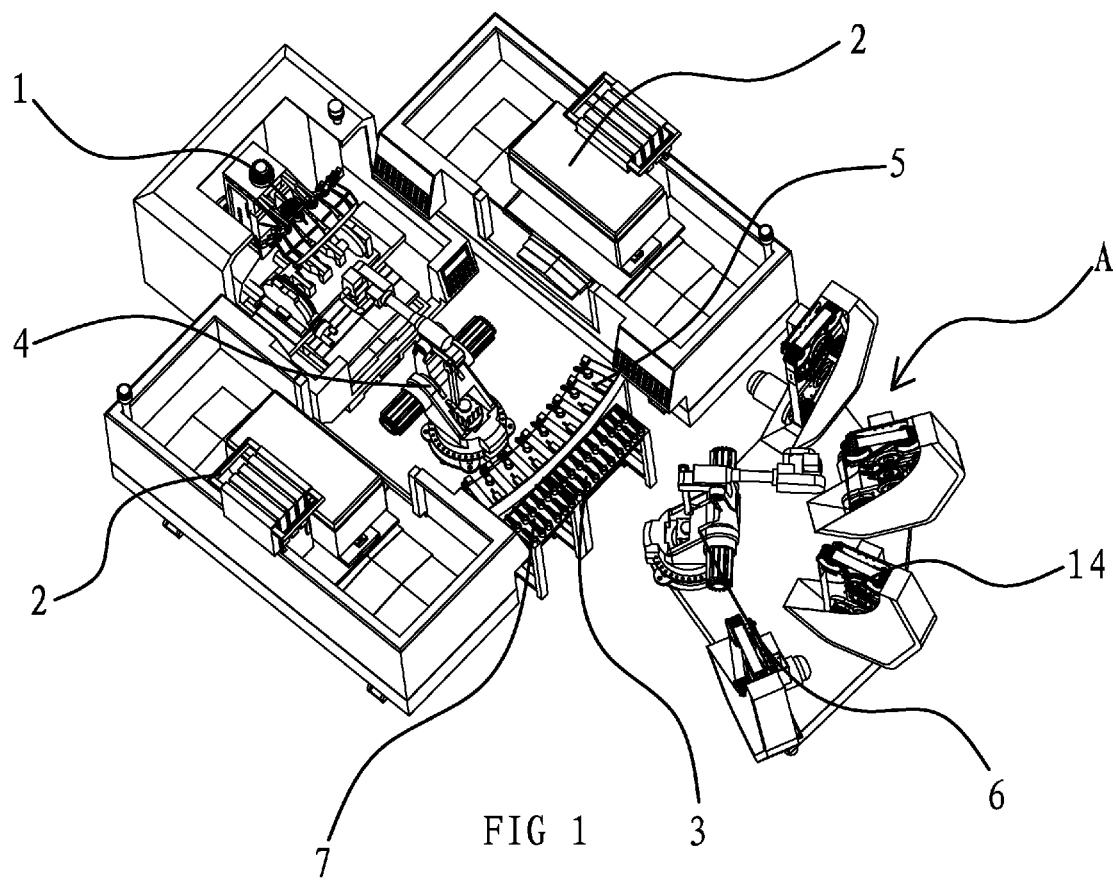
FIG. 1 is a structural diagram of the processing system for a work piece surface according to the invention.

As shown in FIG. 1, a processing system for a work piece surface is disposed on the side of the processing center 1 for machining the work piece. The processing system comprises milling cutter carving machines 2 symmetrically located on left and right sides of the processing center and an article positioning shelf 3 located between the said two milling cutter carving machines 2 to place the work pieces. A first manipulator 4 is provided in the area surrounded by the processing center 1, article positioning shelf 3 and two milling cutter carving machines 2. Two milling cutter carving machines 2 are symmetrically disposed on left and right sides of the first manipulator 4. A seal detection device 5 is provided between the first manipulator 4 and the article positioning shelf 3 and between the two milling cutter carving machines 2. The two milling cutter carving machines 2 are symmetrically disposed on both sides of the seal detection device 5.

Figure 3:
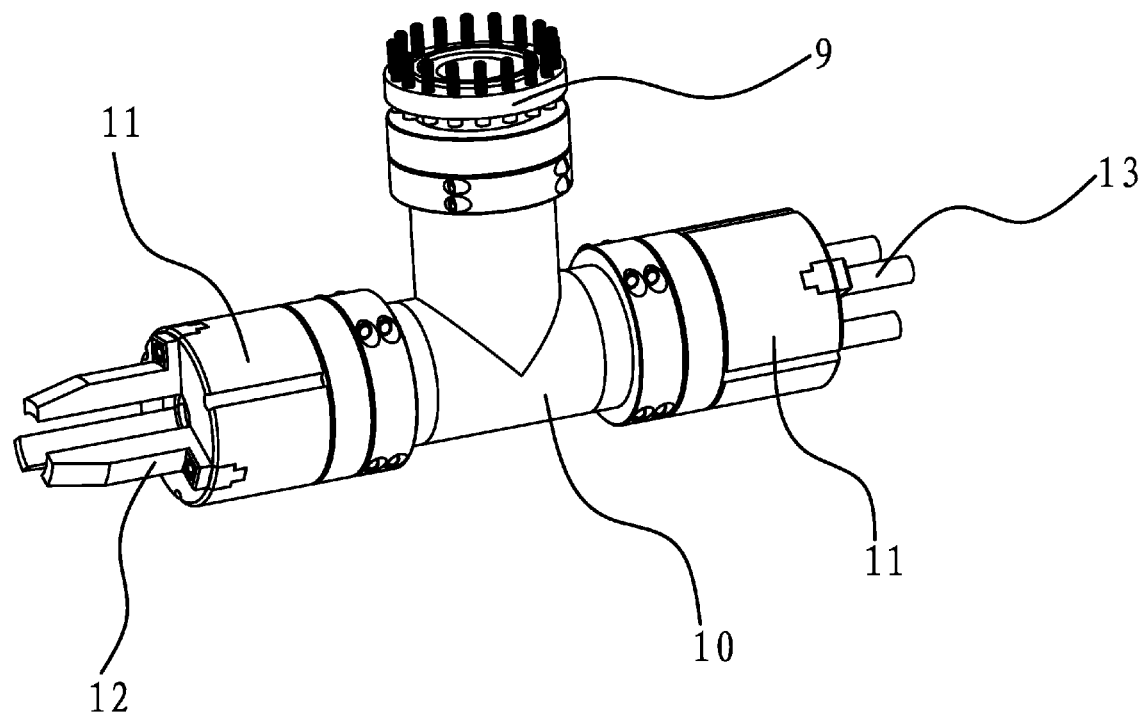
FIG. 3 is a structural diagram of the pneumatic chuck of the first manipulator in the processing system for work piece surface.
Figure 5:
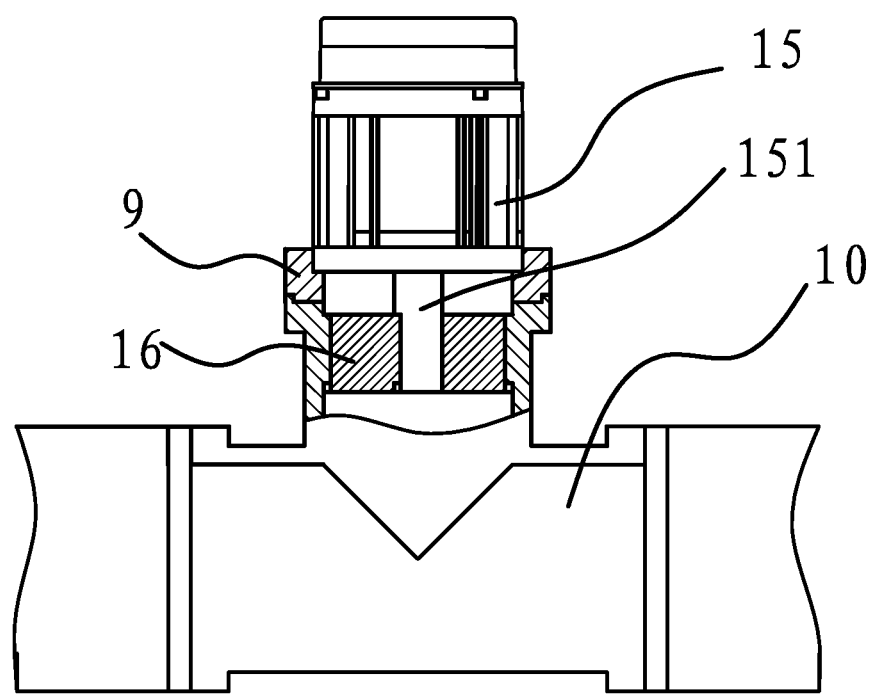
FIG. 5 is a section view of FIG. 3.

As show in FIG. 3, a connecting base 9 is fixed on the first manipulator 4 and a motor 15 is located on the connecting base 9. As shown in FIG. 5, a connecting shaft base 10 is provided at the front end of the connecting base 9. The output shaft 151 of the motor 15 is connected with the coupler 16 within the connecting shaft base 10. The connecting shaft base 10 could rotate relative to the connecting base 9 driven by the output shaft 151 of the motor 15. The connecting shaft base 10 is of a T-shape, a cylinder and a pneumatic gas path driving the cylinder to operate are provided within the connecting shaft base 10, and a three-claw pneumatic chuck 11 is connected to the left and right ends of the connecting shaft base 10 respectively. Claws 12 are respectively fixed on three heads on the three-claw pneumatic chuck 11 on the left end of the connecting shaft base 10 by fasteners. Locating posts 13 are respectively fixed on three heads on the three-claw pneumatic chuck 11 on the right end of the connecting shaft base 10 by fasteners. Each claw of the three-claw pneumatic chuck 11 is hinged to each other and the inner end thereof is connected with the cylinder. The claws are driven to open and close by movement of the cylinder.

A group of polishing units A is provided on the side of the article positioning shelf 3. The polishing unit A includes a second manipulator 6 and several polishers with different polishing precisions. The polisher 14 is an abrasive belt polisher and has a specific configuration identical to that of the polisher used by the processing system for work piece surface proposed by the applicant in the background of the invention, the application number of which is 201310653014.9. The second manipulator 6 has a configuration identical to that of the manipulator used by the processing system for work piece surface. A clamping head is provided on the second manipulator 6 to hold the work piece. The clamping head has a specific configuration identical to that of the work price clamping head of the manipulator disclosed in the patent the number of which is 201320401894.6.

Figure 2:
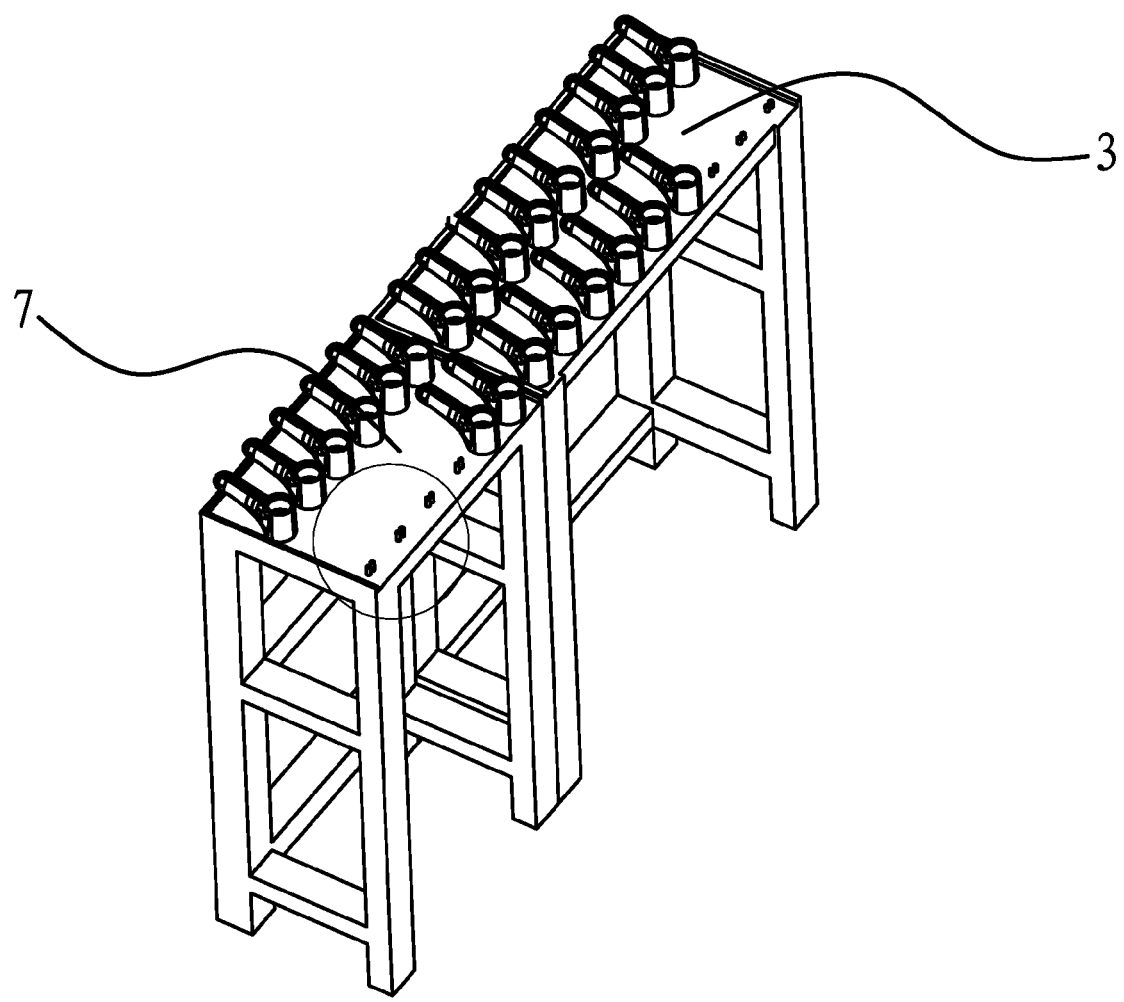
FIG. 2 is a structural diagram of the processing system for work piece surface when work pieces are located on the semi-finished article shelf and article positioning shelf.
Figure 4:
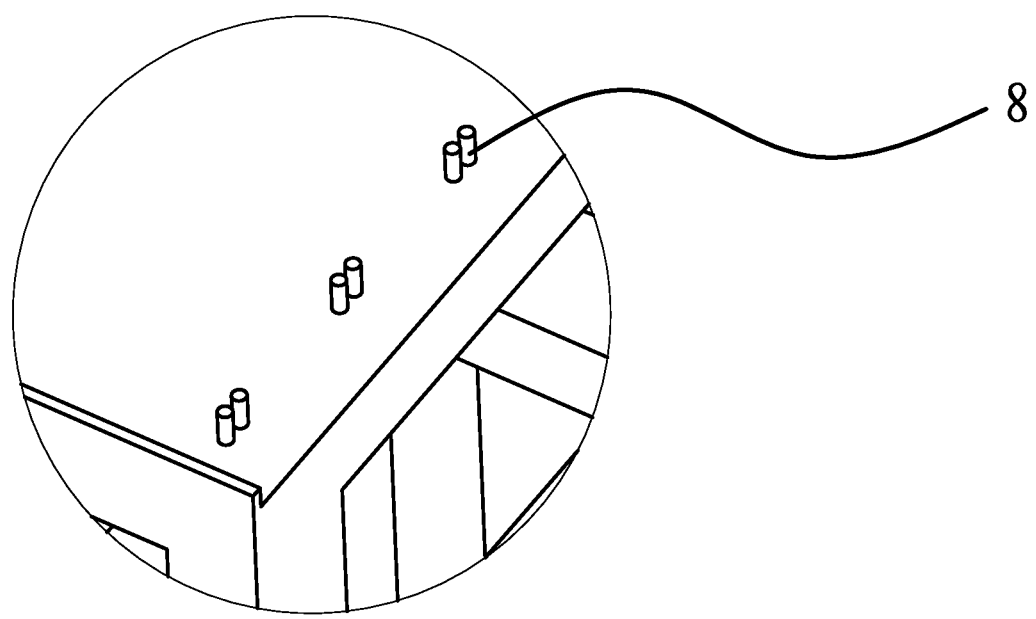
FIG. 4 is partially enlarged view of FIG. 2.

As shown in FIGS. 1, 2 and 4, before the surface is processed by using the processing system for work piece surface, the work piece surface has to be machined firstly by using the processing center 1. A semi-finished article shelf 7 is located between two milling cutter carving machines 2. The semi-finished article shelf 7 is juxtaposed with the article positioning shelf 3. Locating pins 8 are provided on the semi-finished article shelf 7. The number of the locating pins 8 corresponding to each semi-finished work piece is two. When the article to be processed is a water faucet, two locating pins 8 are exactly corresponding to two water inlet holes on the valve core of the water faucet. Each semi-finished work piece is evenly arranged on the semi-finished article shelf 7 by means of the locating pins 9. The semi-finished work piece cooperates with the locating pins 8 through its inner bore and is located on the semi-finished article shelf 7. The first manipulator 4 is pressed against the side of the semi-finished work piece through the claws 12 at the left end of the connecting shaft base 10 thereon. The first manipulator 4 holds the semi-finished work piece and then transfers the semi-finished work piece from the semi-finished article shelf 7 to the processing center 1 for machining.

When the semi-finished work piece is machined within the processing center 1, the first manipulator 4 moves to the semi-finished article shelf 7 over again and then holds the semi-finished work piece by using the claws 12 at the left end of the connecting shaft base 10 and transfers the same to the processing center 1 again. When the previous semi-finished work piece is machined in the processing center 1, the first manipulator 4 is firstly inserted into the inner bore of the machined work piece through three locating posts 13 on the three-claw pneumatic chuck 11 at the right end of the connecting shaft base 10. While the work piece is a water faucet, three locating posts 13 are inserted into two water inlet holes and one water outlet hole on the valve core of the water faucet. As such, the machined work piece is held by the first manipulator 4 through the three-claw pneumatic chuck 11 on the right side of the connecting shaft base 10, and then the motor in the locating base 9 is activated. The output shaft of the motor drives the connecting shaft base 10 to turn by 180 degrees relative to the locating base 9, and then the first manipulator 4 places the semi-finished work piece held by the claws 12 at the left end of the connecting shaft base 10 in the processing center 1 for machining.

Thereafter, the first manipulator 4 transfers the machined work piece held by three locating posts 13 at the right end of the connecting shaft base 10 thereon to the seal detection device 5 to detect the sealing performance. The seal detection device 5 includes a work station and several detection devices on the work station, in which the detection device has a clamp on one side of the work station, a sealing tube corresponding to the clamp, a cylinder corresponding to the sealing tube, and a base located on the side of the work station opposite to the clamp. The end of the clamp corresponding to the sealing tube is provided with a sealing end face attached to the sealing tube. A first groove is provided on the sealing end face. A first seal ring is provided in the first groove. A via hole is provided at the bottom of the clamp and a detection hole matched with the via hole is located in the base. A second seal ring is provided at the base corresponding to the detection hole. For detection purpose, the work piece is placed within the clamp, the cylinder is brought by the sealing tube to move downward together, the work piece is sealed within the clamp by the sealing tube, air is communicated into the work piece by the cylinder, and then the sealing performance could be determined by observing whether there is any blister in the water in communication with the detection hole. Furthermore, while the work piece to be detected is a water faucet, the number of via holes at the bottom of the clamp is three, and the via holes are respectively corresponding to two water inlet holes and one water inlet hole.

Eight work pieces are placed on each milling cutter carving machine 2. The machined work piece is transferred by the first manipulator 4 to the seal detection device 5 for detection. The work piece detected to have disqualified sealing performance is transferred back to the hopper recycling wastes by the first manipulator 4, and the work piece detected to have qualified sealing performance is remained on the seal detection device 5. While the machined work piece is subject to detection of sealing performance, the first manipulator 4 sill repeats the aforesaid actions to continuously hold the semi-finished work piece from the semi-finished article shelf 7 to the processing center 1, to hold the machined work piece in the processing center 1 and then place the semi-finished work place already held into the processing center 1 for machining, to transfer the machined work piece to the seal detection device 5 for detection of sealing performance, and to hold the work pieces passing the detection on the seal detection device 5 in turn and transfer them to one milling cutter caving machine 2 for mounting until the number of the work pieces passing detection of sealing performance on the seal detection device 5 is the same as that of the work pieces on the milling cutter carving machine 2. The milling cutter corresponding to the work position of the work piece on the milling cutter carving machine 2 will conduct peeling against the work piece surface.

While the milling cutter carving machine 2 performs peeling against the work piece surface, the first manipulator 4 still repeats the said actions, and the first manipulator 4 holds these work pieces in turn and transfer them to the other milling cutter carving machine 2 for mounting till the number of the work pieces passing detection of sealing performance on the seal detection device 5 is the same as that of the work pieces on the milling cutter carving machine 2. When mounting is completed on this milling cutter carving machine 2 and peeling is being performed against the work piece surface thereon, peeling is finished in the last milling cutter carving machine 2 and the first manipulator 4 holds the work pieces the surface of which is processed in turn and transfers them to the article positioning shelf 3 to place the work pieces in an order. Locating pins 8 identical to those on the semi-finished article shelf 7 are also provided on the article positioning shelf 3. The work pieces subject to peeling are held by the first manipulator 4 and the inner bores of the work pieces are corresponding to the locating pins 8, so that the work pieces subject to peeling are located on the article positioning shelf 7.

After the work pieces subject to peeling are orderly placed on the article positioning shelf 7, the second manipulator 6 in the polishing unit A holds the work pieces subject to peeling on the article positioning shelf 7 and transfers them to the polishing unit A for polishing. After the work pieces subject to peeling are polished by all the polishers 11 in the polishing unit A, the second manipulator 6 takes them from the polishing unit A and then reholds the work pieces subject to peeling on the article positioning shelf 7 and transfers them to the polishing unit A for polishing. In order to guarantee orderly operation of the whole system, the second manipulator 6 also holds the work pieces subject to peeling on the article positioning shelf 7 in an order.

In the processing system for work piece surface, the work pieces are subject to detection of sealing performance by using the seal detection device 5 after the work pieces are machined in the processing center 1, so that not only the qualification rate of the work pieces could be guaranteed, but also disqualified work pieces could be removed in time, which prevents the surface of disqualified work pieces being processed, reduces resource waste and decreases reprocessing rate of work pieces. Moreover, before the work piece surface is polished, the machined work piece surface is subject to peeling by using the milling cutter caving machine 2. As such, the work piece surface could be conveniently polished in the polishing unit A, the polishing period of the work piece surface could be largely shortened and the polishing efficiency is improved.

A processing method for a work piece surface includes the following steps:
(A) Gripping Work Piece—The first manipulator 4 holds the semi-finished work piece on the semi-finished article shelf 7 by using the claw at one end thereof, and then transfers the semi-finished work piece to the processing center 1 for machining. After the semi-finished work piece is machined, the motor within the locating base 9 is activated. The output shaft of the motor drives the connecting shaft base 10 to turn by 180 degrees relative to the locating base 9. The machined work piece at the processing center 1 is held by the locating post 13 at the other end of the first manipulator 4. The work piece held by the first manipulator 4 is subject to air blowing during transfer to blow off the copper powder on the machined work piece. The first manipulator 4 will not stop moving in the process of air blowing and transfers the machined work piece to the work station of the seal detection device 5 for detection of sealing performance. Subsequent to detection, the first manipulator 4 holds the work piece passing the detection and transfers it to the milling cutter carving machine 2 for mounting.
(B) Surface Peeling—The milling cutter carving machine 2 has eight work positions. The first manipulator 4 holds the work pieces on the milling cutter carving machine 2 in the same number as that of work positions in turn and transfers them to the milling cutter carving machine 2 for mounting. Thereafter, the milling cutters on the milling cutter carving machine 2 corresponding to each work position perform peeling against the surface of the work pieces mounted in the milling cutter carving machine 2 simultaneously. The peeling period of the milling cutter carving machine 2 lasts for three minutes and two milling cutter carving machines 2 are provided. When the milling cutters of one milling cutter carving machine 2 perform peeling against the work piece surface, the first manipulator 4 holds the machined work pieces at the processing center 1 and transfers them to the other milling cutter carving machine 2 for mounting.
(C) Polishing—The first manipulator 4 holds the work pieces subject to peeling on the milling cutter carving machine 2 in turn and transfers them to the article positioning shelf 3 for placing. The second manipulator 6 in the polishing unit A holds the work pieces subject to peeling on the article positioning shelf 3 and transfers them to the polishing unit A. The polishing period of the polishing unit A lasts for two minutes.

The embodiments described herein are merely illustrative of the spirit of the invention. It is obvious for those skilled in the art to make various modifications, supplements or alternatives to these embodiments without departing from the spirit of the invention or the scope of the invention as defined by the appended claims.

LIST OF REFERENCE NUMERALS

1 Processing Center
2 Milling Cutter Carving Machine
3 Article Positioning Shelf
4 First Manipulator
A Polishing Unit
5 Seal Detection Device
6 Second Manipulator
7 Semi-finished Article Shelf
8 Locating Pin
9 Connecting Base
10 Connecting Shaft Base
11 Three-claw Pneumatic Chuck
12 Claw
13 Locating Post
14 Polisher
15 Motor
16 Coupler

What is claimed is:

1. A processing system for a work piece surface disposed on the side of the processing center (1) which machine the work piece, characterized in that, the processing system comprises two milling cutter carving machines (2) symmetrically located on both sides of the processing center (1) and an article positioning shelf (3) located between the said two milling cutter carving machines (2) to place the work piece, a first manipulator (4) is provided between the processing center (1) and the article positioning shelf (3) and between the two milling cutter carving machines (2), the first manipulator (4) transfer the work piece among the processing center (1), the article positioning shelf (3) and two milling cutter carving machines (2), a group of polishing units (A) is located on the side of the article positioning shelf (3), and a second manipulator (6) is provided in the polishing unit (A) which transfer the work piece between the article positioning shelf (3) and the polishing unit (A).

2. The processing system as claimed in claim 1, characterized in that, a seal detection device (5) is further located between the two milling cutter carving machines (2) and the two milling cutter carving machines (2) are symmetrically disposed on both sides of the seal detection device (5), the seal detection device (5) is located between the first manipulator (4) and the article positioning shelf (3), and the first manipulator (4) hold the work piece to perform detection of sealing performance on the seal detection device (5).

3. The processing system as claimed in claim 2, characterized in that, the two milling cutter carving machines (2) are symmetrically disposed on left and right sides of the first manipulator (4).

4. The processing system as claimed in claim 3, characterized in that, a semi-finished article shelf (7) is further located between the two milling cutter carving machines (2) to place the semi-finished work piece, the semi-finished article shelf (7) is juxtaposed with the article positioning shelf (3), and the first manipulator (4) transfer the semi-finished work piece between the semi-finished article shelf (7) and the processing center (1).

5. The processing system as claimed in claim 4, characterized in that, the semi-finished article shelf (7) and article positioning shelf (3) are both evenly provided with several locating pins (8) on the surface thereof for positioning the work piece.

6. The processing system as claimed in claim 3, characterized in that, a connecting base (9) is fixed on the first manipulator (4), a connecting shaft base (10) is connected with the front end of the connecting base (9), the end of the connecting shaft base (10) is connected with a three-claw pneumatic chuck (11) and a claw (12) is fixed on each of three heads of the three-claw pneumatic chuck (11) by a fastener respectively.

7. The processing system as claimed in claim 6, characterized in that, the connecting shaft base (10) is of a T-shape, a motor (15) is provided within the connecting base (9), the output shaft of the motor (15) is connected with the connecting shaft base (10) and the connecting shaft base (10) turn relative to the connecting base (9) driven by rotation of the output shaft (151) of the motor (15), the three-claw pneumatic chuck (11) is connected with each of the left and right ends of the connecting shaft base (10) respectively, the claws (12) are fixed on three heads of the three-claw pneumatic chuck (11) at the left end of the connecting shaft base (10) by fasteners respectively, and a locating post (13) is fixed on each of three heads of the three-claw pneumatic chuck (11) at the right end of the connecting shaft base (10) by a fastener respectively.

8. The processing method for a work piece surface, comprising the following steps:
(A) gripping a work piece, in which a first manipulator (4) holds a machined work piece at the processing center (1) and transfers the held work piece to a milling cutter carving machine (2) for mounting;
(B) surface peeling, in which several work positions are provided on the milling cutter carving machine (2), and after the first manipulator (4) holds the work pieces in the same number as that of the work positions on the milling cutter carving machine (2) in turn and transfers them to the milling cutter carving machine (2) for mounting, the milling cutters on the milling cutter carving machine (2) corresponding to each of the work positions perform peeling against the surface of the work pieces mounted in the milling cutter carving machine (2) simultaneously; and
(C) polishing, in which the first manipulator (4) holds the work pieces subject to peeling on the milling cutter carving machine (2) in turn and transfers the same to the article positioning shelf (3) for placing, and a second manipulator (6) in a polishing unit (A) holds the work piece subject to peeling on the article positioning shelf (3) and transfers the same to the polishing unit (A) for polishing.

9. The processing method as claimed in claim 8, characterized in that, in the step (A), the first manipulator (4) firstly holds the semi-finished work piece at the semi-finished article shelf (7) and transfers the same to the processing center (1) for machining.

10. The processing method as claimed in claim 8, characterized in that, in the step (A), after the first manipulator (4) holds the machined work piece at the processing center (1), the first manipulator (4) firstly transfers the work piece to the seal detection device (5) for detection of sealing performance, and subsequent to detection the first manipulator (4) holds the work piece passing the detection and transfers the same to the milling cutter carving machine (2).

11. The processing method as claimed in claim 10, characterized in that, in the step (A), the work piece held by the first manipulator (4) is subject to air blowing to blow off the copper powder on the machined work piece before the first manipulator (4) transfers the machined work piece to the work station of the seal detection device (5).

* * * * *